United States Patent
Bajic et al.

(10) Patent No.: US 8,650,428 B2
(45) Date of Patent: Feb. 11, 2014

(54) DYNAMIC WEIGHT CALCULATION IN A DIGITAL POWER ESTIMATION AND MANAGEMENT SYSTEM

(75) Inventors: Lejla Bajic, Toronto (CA); Ljubisa Bajic, Toronto (CA)

(73) Assignee: ATI Technologies ULC, Markham (CA)

(*) Notice: Subject to any disclaimer, the term of this patent is extended or adjusted under 35 U.S.C. 154(b) by 281 days.

(21) Appl. No.: 13/185,602

(22) Filed: Jul. 19, 2011

(65) Prior Publication Data

US 2013/0024713 A1    Jan. 24, 2013

(51) Int. Cl.
*G06F 1/26* (2006.01)
*G01R 21/00* (2006.01)
*G01D 18/00* (2006.01)

(52) U.S. Cl.
USPC ............... 713/340; 713/300; 702/60; 702/64; 702/85

(58) Field of Classification Search
USPC .................. 713/300, 340; 702/60, 64, 85
See application file for complete search history.

(56) References Cited

U.S. PATENT DOCUMENTS

| | | | |
|---|---|---|---|
| 5,940,779 A * | 8/1999 | Gaitonde et al. | 702/60 |
| 7,673,160 B2 | 3/2010 | Peterson | |
| 7,925,899 B2 | 4/2011 | Gumma | |
| 8,010,824 B2 * | 8/2011 | Naffziger | 713/340 |
| 2005/0050495 A1 * | 3/2005 | McGuffin et al. | 716/5 |
| 2008/0098242 A1 | 4/2008 | Peterson | |
| 2008/0122412 A1 * | 5/2008 | Burton et al. | 323/234 |
| 2010/0268975 A1 * | 10/2010 | Bose et al. | 713/340 |
| 2011/0291746 A1 * | 12/2011 | Ibrahim et al. | 327/538 |
| 2012/0030481 A1 * | 2/2012 | Bose et al. | 713/300 |
| 2012/0109550 A1 * | 5/2012 | Naffziger et al. | 702/61 |
| 2012/0260117 A1 * | 10/2012 | Acar et al. | 713/340 |

* cited by examiner

*Primary Examiner* — Vincent Tran
(74) *Attorney, Agent, or Firm* — Meyertons Hood Kivlin Kowert & Goetzel; Stephen J. Curran

(57) ABSTRACT

A system includes a power management unit that may be configured to estimate the power consumed by at least a portion of each of one or more processor cores during operation of each processor core. The power management unit may be configured to generate a sum of activity values and normal weight factor values for a predetermined set of signals within each processor core to estimate the power consumed. The power management unit may also be configured to adaptively generate and selectively use new weight factor values to estimate the power consumed based upon a total measured dynamic power consumed by each processor core during operation.

20 Claims, 5 Drawing Sheets

DYNAMIC WEIGHT CALCULATION IN A DIGITAL POWER ESTIMATION AND MANAGEMENT SYSTEM

BACKGROUND

1. Technical Field

This disclosure relates to integrated circuits and, more particularly, to digital power estimation of components on the integrated circuits during operation.

2. Description of the Related Art

Many modern processors are capable of consuming a great deal of power and in so doing may generate a significant amount of heat. If left unchecked, this heat could cause catastrophic damage to the processor. Thus, power management systems have been developed to limit the power that the processor consumes and thus the heat generated. In many power management systems, the thermal design power (TDP) for the whole chip is commonly the primary metric that is used to control power and ensure thermal limits are not exceeded. Typically, if the thermal limits are being reached, or the thermal power reaches a particular threshold, the power management system may throttle the processor by reducing performance. Conversely, if power consumption can be accurately measured while running a given application, and the power used is less than the TDP capability of the platform, performance may be increased by allowing the processor to consume the available headroom in the TDP by increasing the operating voltage, the operating frequency or both. However, since the capabilities of conventional thermal measurement mechanisms have less than acceptable granularity and repeatability in many cases, modulating activity based upon thermal and/or power limits of individual components becomes difficult. This may be particularly true vary as various application programs are executed and the corresponding processor loads increase and decrease.

SUMMARY OF THE EMBODIMENTS

Various embodiments of a system and method for dynamically calculating weights for use in a digital power estimation system are disclosed. Broadly speaking, controlling power consumption on an integrated circuit device has been an imprecise effort in the past. With the advent of digital power estimation techniques, the granularity and precision of the estimated power on a per component basis has improved significantly. However, as conditions change such as processor loads changing as various applications execute, the accuracy of some digital power estimations may degrade. Accordingly, a power management system is contemplated that may estimate the power consumed by the various processor cores and portions of those cores in a processing node using signal activity and weight factor values that correspond to those signals. In addition, during operation of the processor cores the power management system may adaptively generate new weight factor values in the background. The new weight factors may be used for the power estimates if they produce more accurate power estimates than current power estimates.

In one embodiment, a system includes a power management unit that may be configured to estimate the power consumed by at least a portion of each of one or more processor cores during operation of each processor core. The power management unit may be configured to generate a sum of activity values and normal weight factor values for a predetermined set of signals within each processor core to estimate the power consumed. The power management unit may also be configured to adaptively generate and selectively use new weight factor values to estimate the power consumed based upon a total measured dynamic power consumed by each processor core during operation.

In one specific implementation, the power management unit may be configured to independently control a performance of each of the processor cores based upon the estimation of the power consumed by various portions of each processor core.

In another specific implementation, the system may further include a voltage regulator unit that may be configured to provide a voltage and corresponding current to each processor core and to provide an associated voltage and current measurement value to the power management unit to obtain the total measured dynamic power.

In another embodiment, a method includes a power management unit measuring a total dynamic power consumed by an integrated circuit device during operation of the integrated circuit device. The method may also include generating a weighted sum that includes activity values and normal weight factor values for each of a plurality of predetermined signals within the semiconductor device to generate an estimate of the power consumed by at least a portion of the integrated circuit device. The method may further include adaptively generating and selectively using new weight factor values to estimate the power consumed based upon a difference between the measured total dynamic power consumed by at least a portion of the integrated circuit device and the estimate of the power consumed during operation of the integrated circuit device.

Figure 1:
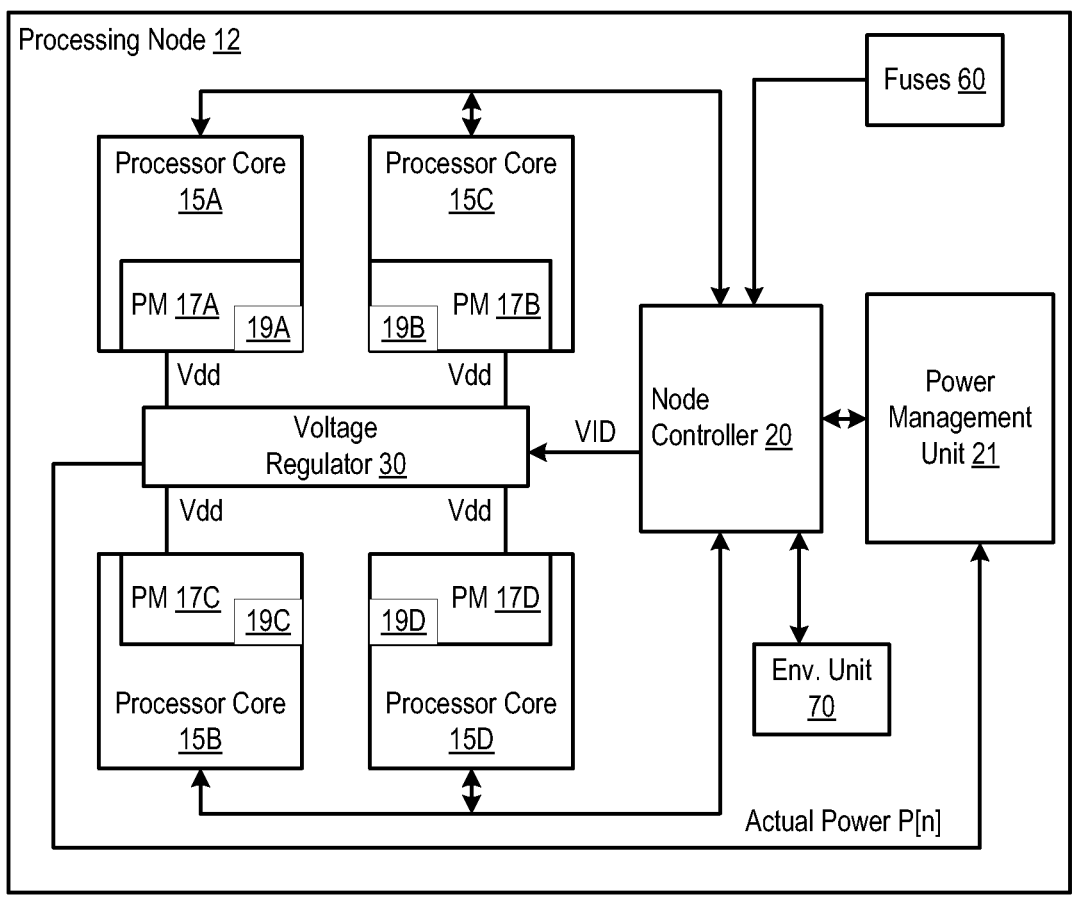
FIG. 1 is a block diagram of one embodiment of a processing node having a power management unit and processor cores with digital power monitors.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

Turning now to FIG. 1, a simplified block diagram of one embodiment of a processing node is shown. In the illustrated embodiment, the processing node 12 includes processor cores 15A through 15D coupled to a voltage regulator 30, and a node controller 20, which is coupled to fuses 60, an environmental unit 70, and to a power management unit 21. In one embodiment, processing node 12 may be a single integrated circuit chip comprising the circuitry shown therein in FIG. 1. That is, processing node 12 may be a chip multiprocessor (CMP). Other embodiments may implement the processing node 12 as two or more separate integrated circuits, as desired. Any level of integration or discrete components may be used. It is noted that components having a number and a letter as a reference designator may be referred to by the number only where appropriate.

It is also noted that, a processing node such as processing node 12 may include any number of processor cores, in various embodiments. It is further noted that processing node 12 may include many other components that have been omitted here for simplicity. For example, in various embodiments processing node 12 may include an integral memory controller and various communication interfaces for communicating with other nodes, and I/O devices.

In one embodiment, node controller 20 may include various interconnection circuits (not shown) for interconnecting processor cores 15A through 15D to each other, to other nodes, a to a system memory (not shown), and to the power management unit 21.

The power management unit 21 may be configured to control the operating frequency for each core and/or the power supply voltages for the node using the voltage identifier (VID) signals provided to the voltage regulator(s) 30. In one embodiment, the maximum and minimum operating frequencies for the node and the maximum and minimum power supply voltages for the node may be provided via fuses 60 that are blown during manufacture. In addition, as described further below, the power management unit 21 may be configured to control the power consumed by each core based upon power estimates provided by the power monitors 17A through 17D within each of processor cores 15A through 15D, respectively. Furthermore, the power management unit 21 may be configured to dynamically calculate new weights to be used to estimate power consumed by each of the processor cores 15 during operation, as described further below. In the illustrated embodiment, the power management unit 21 is implemented as a separate embedded microcontroller unit. However, in other embodiments the power management unit 21 may be part of the node controller 20, or may be a microcontroller unit that is separate from the processing node 12, as desired.

Generally, a processor core (e.g., 15A-15D) may include circuitry that is designed to execute instructions defined in a given instruction set architecture. That is, the processor core circuitry may be configured to fetch, decode, execute, and store results of the instructions defined in the instruction set architecture. For example, in one embodiment, processor cores 15A-15D may implement the x86 architecture, although any architecture is possible. The processor cores 15A-15D may comprise any desired configurations, including superpipelined, superscalar, or combinations thereof. Other configurations may include scalar, pipelined, non-pipelined, etc. Various embodiments may employ out of order speculative execution or in order execution. In addition, processor cores 15A-15D may be any type of processing element and may not be identical nor even similar to each other. For example, any of processor cores 15A-15D may be a central processing unit (CPU) core, graphics processing unit (GPU) core, digital signal processing (DSP) core, application processor (AP) core, or any other type of core. Additionally, processor cores 15A-15D may be any combinations thereof.

In the illustrated embodiment, processor core 15A includes a power monitor 17A, which includes one or more storages (e.g., reg. 19A), for example. Likewise, processor core 15B includes a power monitor 17B, which also includes one or more storages (e.g., reg. 19B), for example, and processor cores 15C and 15D, include a respective power monitor 17C and 17D.

In various embodiments, the power monitors 17 in combination with the power management unit 21 may be configured to determine an estimated power consumed by each respective processor core 15 or portions thereof using, in one embodiment, digital power estimation techniques that take into account digital signal activity within each processor core 15. As described further below, the power monitors 17 may be configured to store signal names and in some embodiments corresponding weight factor values.

In one embodiment, by monitoring (i.e., sampling) the signal activity of the signals corresponding to stored signal names, each power monitor 17 may be configured to generate signal activity values that correspond to the activity levels of the signals being monitored. These activity values may be provided to the power management unit 21, which may, as described further below, use the activity values and corresponding weight factor values to estimate the total power consumed, as well as the power consumed by individual portions of a respective processor core 15. In such an embodiment, the weight factor values may be programmed into a storage (shown in FIG. 3) on the power management unit 21.

In an alternative embodiment, each power monitor 17 may be configured to monitor the activity factor or level of each signal that has been programmed into it, and to multiply that activity factor by the weight factor for that signal to generate energy values using, for example, linear combining techniques. Each power monitor 17 may, depending on how it is programmed, sum the resulting energy values for each monitored signal to obtain the total energy value for the processor core 15. In another embodiment, each power monitor 17 may calculate the energy value for only specified portions of the processor core 15. The power monitors 17 may then provide energy value(s) that correspond to the consumed power to the power management unit 21.

The power management unit 21 may increase or decrease the frequency of one or more cores, increase or decrease the operating voltages of the cores, or otherwise control the operational state of the cores in an effort to optimize performance while staying within the thermal budget of the processing node 12 based upon the power being consumed by the processor cores 15. Thus, the combination of the power monitors 17 and the power management unit 21 may be referred to as a power estimation and management system or subsystem.

In various embodiments, the signal names may be programmed into the power monitors 17 and depending on the implementation, an initial set of weight factor values may be programmed into the power monitors 17 and/ or the power management unit 21 either during manufacturing, or using specialized test modes after manufacture. The initial weight factor values may be determined using techniques such as gate level simulation of a register transfer level (RTL) design of the IC, as well as direct monitoring of a representative IC device. However, as will be described in greater detail below in conjunction with the description of FIG. 2 through FIG. 4, in various embodiments, the power management unit 21 may be configured to continually compare the estimated power to the actual measured power consumed by the processor cores 15, and to dynamically generate new or revised weight factor values based upon the difference between the actual and estimated power values. The new weight factor values may be sent to and used by the power monitors 17 or the power management unit 21 to get a more accurate power estimate if the difference exceeds some predetermined threshold.

Figure 2:
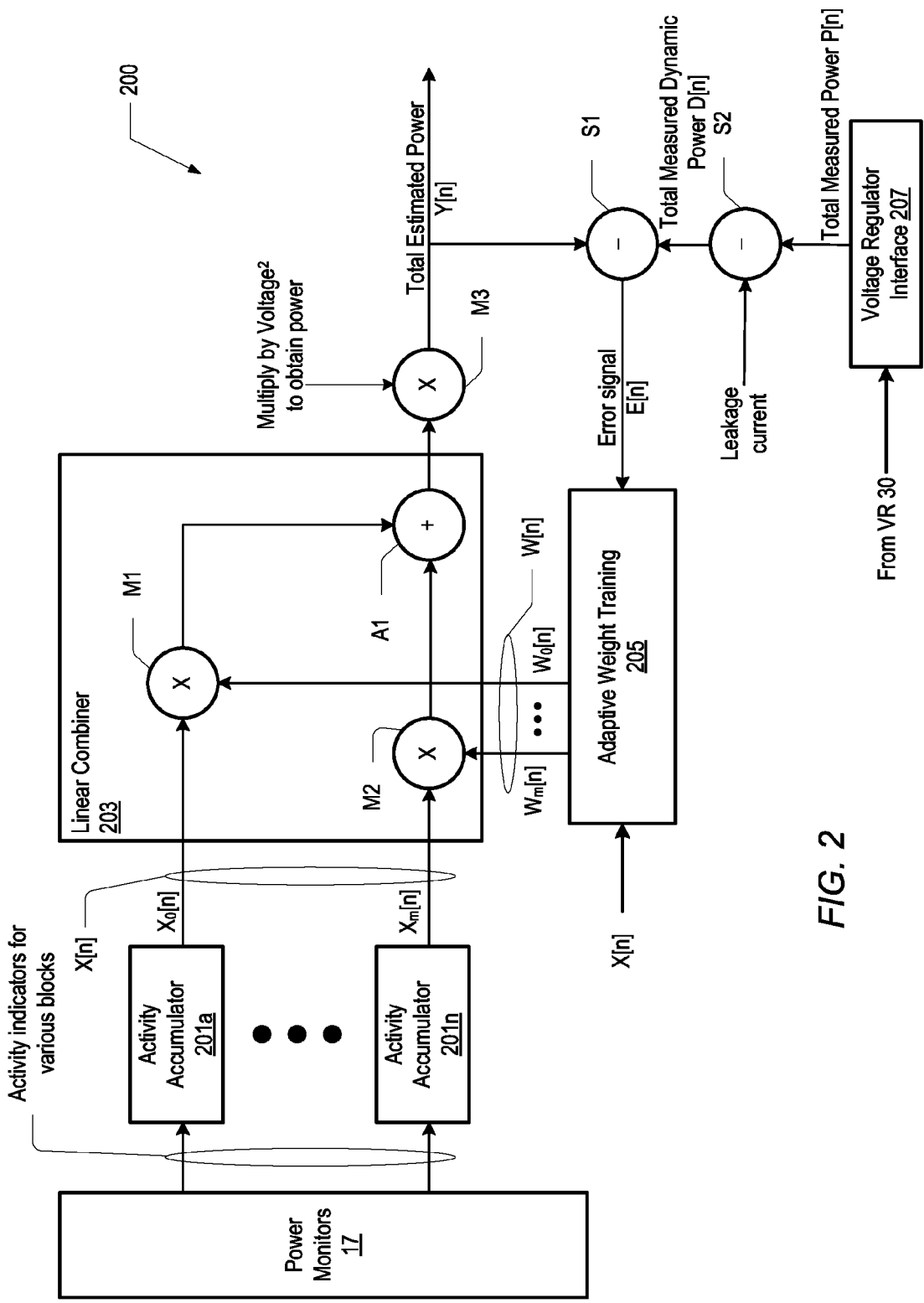
FIG. 2 is a conceptual block diagram illustrating details of the power estimation and management system of FIG. 1.

Referring to FIG. 2, a conceptual block diagram illustrating details of an embodiment of the power estimation and management system of FIG. 1 is shown. It is noted that components that correspond to those shown in FIG. 1 are numbered identically for clarity and simplicity. The power estimation and management system 200 includes power monitors 17 that are coupled to activity accumulators 201a through 201n, where n may represent any number. The activity accumulators 201 are coupled to a linear combiner 203, which is coupled to a multiplier block M3. The power estimation and management system 200 also includes an adaptive weight training unit 205 which is coupled to the linear combiner 203. In addition, the power estimation and management system 200 includes a voltage regulator interface 207 that is coupled to a subtractor S2, which is coupled to a subtractor S1, which is in turn coupled to the adaptive weight training unit 205.

In one embodiment, the power monitors 17 may be representative of the power monitors 17 of FIG. 1, and may provide activity indicator sample values from one or more circuit blocks with the respective processor cores 15 of FIG. 1. The activity indicator samples may be accumulated by the activity accumulators 201 and the accumulated values X[n] are provided to the linear combiner 203. In the illustrated embodiment, the linear combiner 203 multiplies the various accumulated activity values X[n] with respective weight factor values W[n] provided by the adaptive weight training unit 205 using representative multipliers M1 and M2. The multiplied values are then summed at adder A1 and output by the linear combiner 203 to produce an energy value that corresponds to the power consumed by the various blocks in the processor cores 15. The output energy value is multiplied by a squared voltage value to produce a corresponding total estimated power value Y[n].

As shown, the voltage regulator interface receives current and voltage value input from the voltage regulators 30 from FIG. 1. The input is converted to a total measured power value P[n] and provided to subtractor S2, which subtracts power associated with leakage current of the processor cores 15 to produce a total measured dynamic power value D[n].

The total estimated power value Y[n] is provided to the subtractor S1 along with the total measured dynamic power value D[n] to produce an error signal E[n], which represents the difference between the measured power and the estimated power values. This error value E[n] is used by the adaptive weight training unit 205 to generate new weight factor values as described further below.

In one embodiment, the adaptive weight training unit 205 may calculate the weight factor values by employing an adaptive filter-like model which finds filter coefficients. More particularly, in various embodiments, any of a variety of adaptive filter coefficient algorithms may be used. For example, a least mean square (LMS) algorithm, a normalized least mean square (NLMS) algorithm, a recursive least squares (RLS), among others may be used. In the NLMS algorithm the weight factor values are calculated according to the following equation:

$$W[n+1]=W[n]+u*e[n]*X[n]/(X[n]*\text{transpose}(X[n])) \quad (1)$$

where 'u' is a programmable constant that allows a tradeoff between the speed of convergence and the quality of convergence, and e[n] are the Eigen vectors. The algorithm may be selected based on speed of convergence, mathematical complexity and/or computational load that running the algorithm places on the system.

In one embodiment, with the exception of the power monitors 17, the components of the power estimation and management system 200 may be implemented by a microcontroller implementation of the power management unit 21 of FIG. 1.

Figure 3:
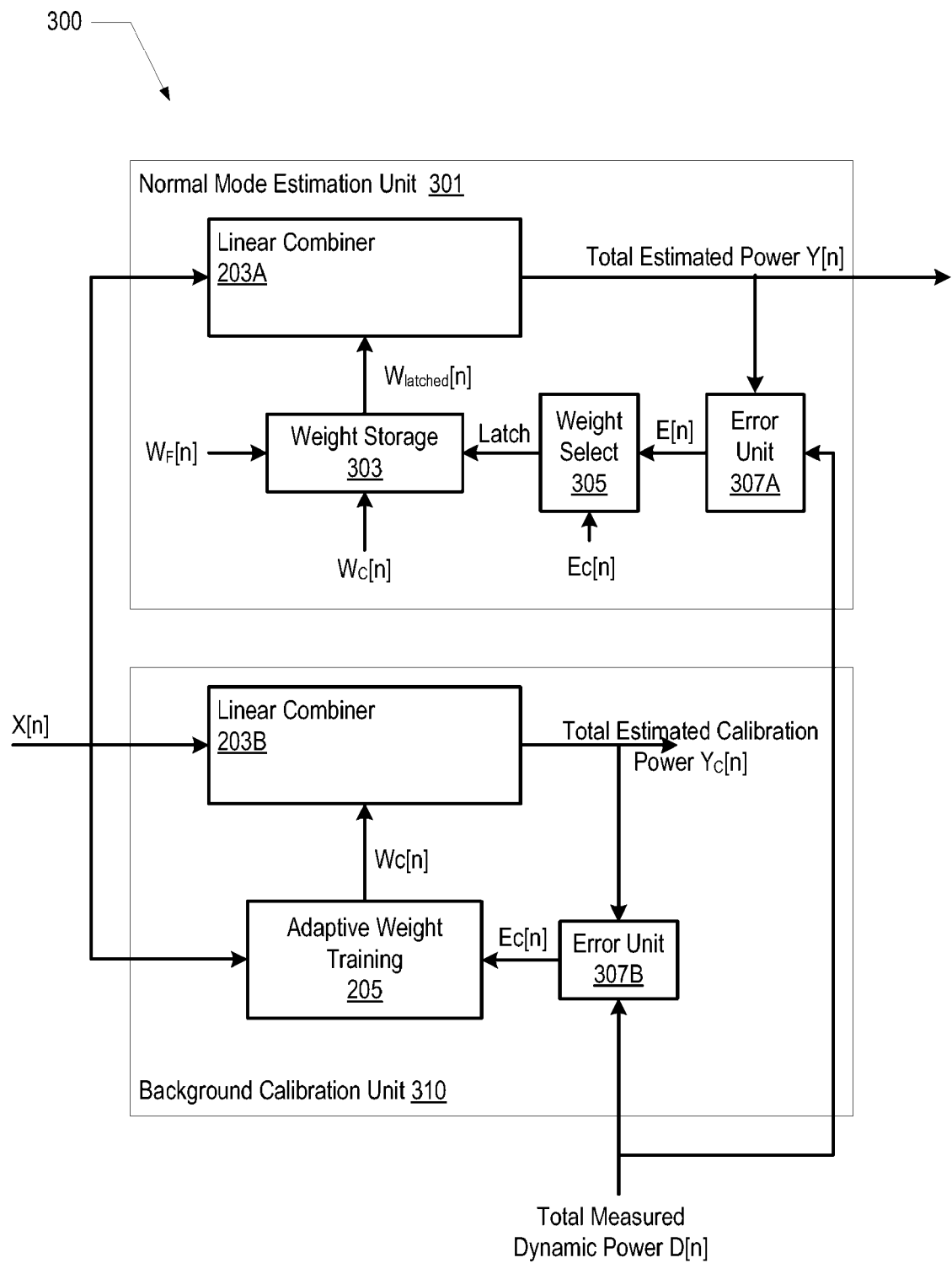
FIG. 3 is a conceptual block diagram illustrating additional details of the power estimation and management system of FIG. 1.

Turning to FIG. 3, a conceptual block diagram illustrating additional details of an embodiment of the power estimation and management system of FIG. 1 is shown. In one embodiment, the components of the power estimation and management system 300 may be implemented by a microcontroller implementation of the power management unit 21 of FIG. 1. The power estimation and management system of FIG. 3 includes a normal mode estimation unit 301 and a background calibration unit 310. As shown, both the background calibration unit 310 and the normal mode estimation unit 301 have similarities with the power estimation and management system 200 of FIG. 2. More particularly, they both have a linear combiner (e.g., 203B and 203A, respectively) that receives accumulated activity values X[n], such as those sampled and provided by the power monitors 17, for example, and they both have an error unit (e.g., 307B and 307A, respectively). The background calibration unit 310 also includes an adaptive weight training unit 205 that is coupled to the linear combiner 203B. In contrast, the normal mode estimation unit 301 includes a weight storage 303 instead of the adaptive weight training unit, and a weight select unit 305 that is coupled to the weight storage 303. In various embodiments, the weight storage 303 may be any type of storage such as a memory or a register set, for example. It is noted that the activity accumulators such as the activity accumulators 201 of FIG. 2 are not shown for simplicity.

In one embodiment, the normal mode estimation unit 301 may be configured to operate and provide estimated power Y[n] for the power management unit 21 during operation based upon the weight factor values and the input accumulated activity X[n]. Accordingly, the weight factor values are latched and stored within the weight storage 303 and used by the linear combiner 203A in much the same way as the linear combiner 203 of FIG. 2. It is noted that, in embodiments in which weight storage 30s is implemented as a flip-flop or latch-based register, the weight factor values may be latched by the latch signal. However, in embodiments in which the weight storage is a memory, the latch signal may include write enable and other control signals to write the weight factor values into the storage 303.

In one embodiment, the background calibration unit 310 may be configured to generate new weight factor values on a continual basis. In other embodiments, the background calibration unit 310 may be configured to generate new weight factor values on an as-needed basis. In either case, the background calibration unit 310 may generate new weight factor values based upon the difference between total measured dynamic power D[n], the total estimated calibration power Yc[n], and the input accumulated activity X[n].

The weight select unit 305 may be configured to latch new weight factor values into the weight storage 303 based upon the amount of error generated by the normal mode estimation unit 301 and the background calibration unit 310. For example, during operation the normal mode estimation unit 301 generates an error signal E[n] based upon the difference between total measured dynamic power D[n] and the total estimated power Y[n]. In one embodiment, the weight select unit 305 may be configured to compare the error signals E[n] and Ec[n] and if the error signal E[n] is larger than Ec[n] by an amount that is greater than a predetermined threshold, the weight select unit 305 may latch the new weight factor values Wc[n] generated by the background calibration unit 310. In other embodiments, the weight select unit 305 may latch the new weight factor values Wc[n] generated by the background calibration unit 310 if the error E[n] is larger than Ec[n] by any amount. Thus, the power estimation and management system 300 may dynamically adapt to varying processing conditions that may occur as a result of different processing loads.

In various embodiments, the initial weight factor values Wf[n] may be provided to the weight storage from different sources. As mentioned above, in one embodiment an initial set of weight factor values may be programmed into the weight storage 303 when the processing node 12 is initialized based upon fused values that are determined in a lab or test environment. In another embodiment, the initial weight factor values may be determined by the background calibration unit 310 as the processing node 12 is initialized and latched by the weight select unit 305.

Figure 4:
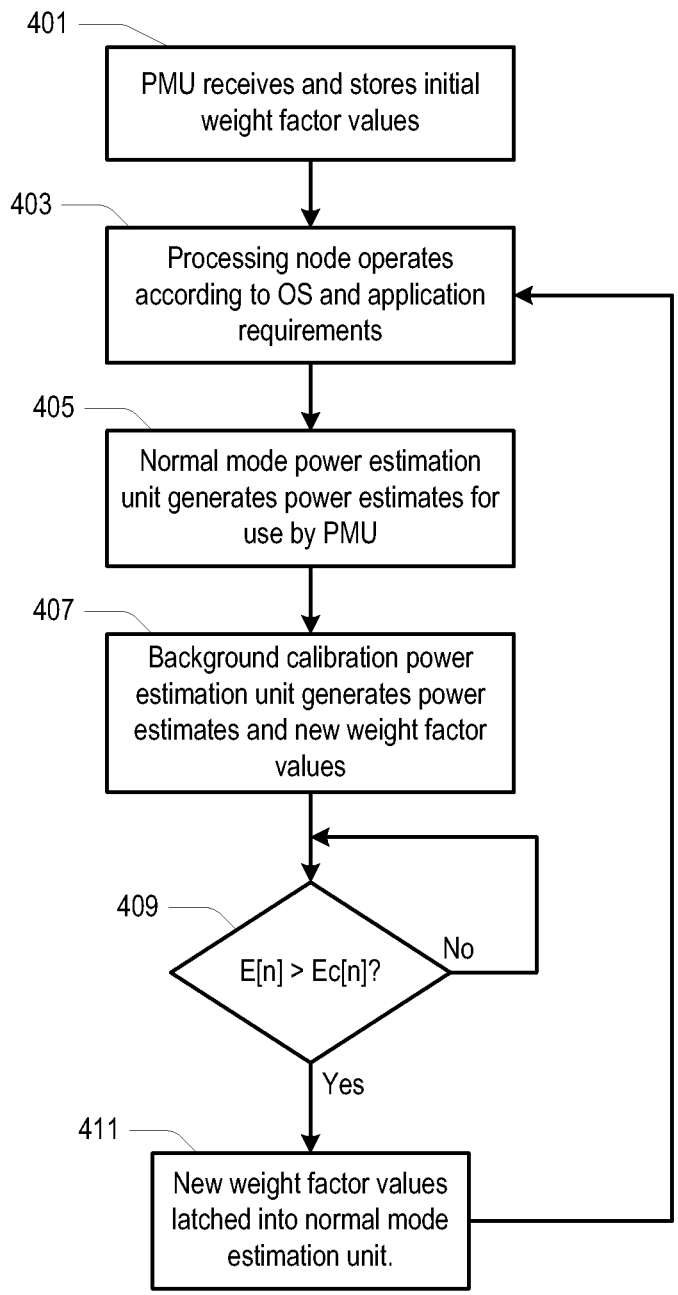
FIG. 4 is a flow diagram describing operational aspects of one embodiment of the power estimation and management system of the processing node of FIG. 1 through FIG. 3.

In FIG. 4, a flow diagram describing operational aspects of an embodiment of the power estimation and management system of FIG. 1 through FIG. 3 is shown. Referring collectively now to FIG. 1 through FIG. 4, and beginning in block 401 of FIG. 4, in one embodiment the power management unit 21 receives an initial set of weight factor values. As described above the initial values may come from fuses, or from the background calibration unit 310 of FIG. 3. The processing node 12 may then operate according to the OS and application requirements (block 403). During operation of the processing node 12, in one embodiment, the normal mode estimation unit 301 provides power estimation values for use by the power management unit 21 in controlling the performance levels of the processor cores 15 (block 405). As the power estimates are generated, the normal mode estimation unit 301 is also generating an error value E[n] as described above. In addition, the background calibration unit 310 is also generating power estimates and error values Ec[n] concurrently with the normal mode estimation unit 301. However, in contrast to the normal mode estimation unit 301, the background calibration unit 310 is also generating new weight factor values Wc[n] based upon the error value Ec[n] (block 407).

In one embodiment, at some predetermined time interval the weight select unit 305 compares the error signals Ec[n] and E[n] (block 409). As described above if the E[n] is not larger than the Ec[n] by some predetermined amount, then operation continues. However, if the E[n] is larger than the Ec[n] by the predetermined amount, the new weight factor values may be latched and stored within the weight storage 303 of the normal mode estimation unit 301 (block 411). Operation proceeds as described above in conjunction with the description of block 403.

Accordingly, as processor core loads change, the background calibration unit 310 may track the variations and dynamically generate corresponding weight factor values that may more accurately model the actual activity of the monitored signals. This may allow the power estimation and management system to more accurate estimate the power consumed by the processor cores 15.

Figure 5:
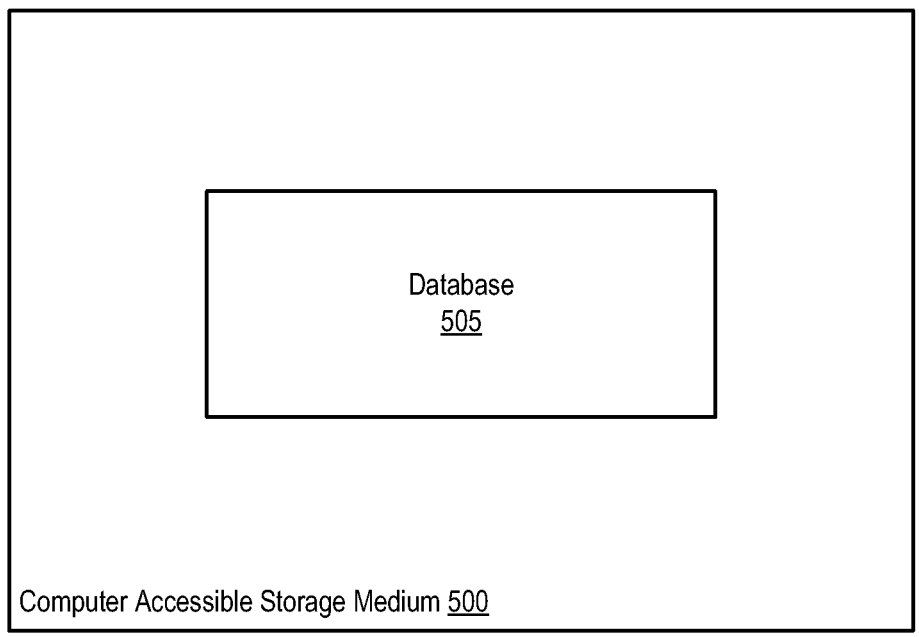
FIG. 5 is a block diagram of a computer accessible storage medium including a database representative of the processing node of FIG. 1.

Turning to FIG. 5, a block diagram of a computer accessible storage medium 500 including a database 505 representative of the processing node 12 of FIG. 1 is shown. Generally speaking, a computer accessible storage medium 500 may include any non-transitory storage media accessible by a computer during use to provide instructions and/or data to the computer. For example, a computer accessible storage medium 500 may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Generally, the database 505 of the processing node 12 carried on the computer accessible storage medium 500 may be a database or other data structure which can be read by a program and used, directly or indirectly, to fabricate the hardware comprising the processing node 12. For example, the database 505 may be a behavioral-level description or register-transfer level (RTL) description of the hardware functionality in a hardware definition language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the processing node 12. The netlist may then be placed and routed to produce a data set describing geometric shapes to be applied to masks. The masks may then be used in various semiconductor fabrication steps to produce a semiconductor circuit or circuits corresponding to the processing node 12. Alternatively, the database 505 on the computer accessible storage medium 400 may be the netlist (with or without the synthesis library) or the data set, as desired.

While the computer accessible storage medium 500 carries a representation of the processing node 12, other embodiments may carry a representation of any portion of the processing node 12, as desired.

It is noted that although the above embodiments are described in terms of a processing node and processor cores, it is contemplated that the dynamic calibration technique described above may be used with any power estimation system that estimates power on semiconductor devices using digital techniques in which a weighted sum of signal activity is generated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
a power management unit coupled to one or more processor cores and configured to estimate the power consumed by at least a portion of each processor core during operation of each processor core;
wherein the power management unit is configured to generate a sum of activity values and normal weight factor values for a predetermined set of signals within each processor core to estimate the power consumed; and
wherein the power management unit is configured to adaptively generate and selectively use revised weight factor values to estimate the power consumed based upon a difference between the estimate of the power consumed and a total measured dynamic power consumed by each processor core during operation.

2. The system as recited in claim 1, wherein the power management unit is configured to independently control a performance of each of the processor cores based upon the estimation of the power consumed by at least a portion of each processor core.

3. The system as recited in claim 1, wherein the system further includes a voltage regulator unit configured to provide a voltage and corresponding current to each processor core and to provide an associated voltage and current measurement value to the power management unit to obtain the total measured dynamic power.

4. The system as recited in claim 3, wherein the power management unit is configured to subtract a power amount corresponding to a static leakage current from a total measured power to obtain the total measured dynamic power.

5. The system as recited in claim 1, wherein the power management unit is configured to use the revised weight factor values in response to a difference between an error value generated from the normal weight factor values and an error value generated from the revised weight factor values.

6. The system as recited in claim 1, wherein the power management unit includes a calibration unit configured to adaptively generate the revised weight values concurrently with generation of the estimate of the power consumed using the normal weight factor values.

7. The system as recited in claim 1, wherein each signal corresponds to a respective activity value and a respective weight factor value, wherein a given activity value corresponds to a number of signal level transitions of the corresponding signal.

8. A method comprising:
a power management unit measuring a total dynamic power consumed by an integrated circuit device during operation of the integrated circuit device;
generating a weighted sum that includes activity values and normal weight factor values for each of a plurality of predetermined signals within the semiconductor device to generate an estimate of the power consumed by at least a portion of the integrated circuit device; and
adaptively generating and selectively using new weight factor values to estimate the power consumed based upon a difference between the measured total dynamic power consumed by at least a portion of the integrated circuit device and the estimate of the power consumed during operation of the integrated circuit device.

9. The method as recited in claim 8, wherein generating the new weight factor values includes executing an adaptive coefficient algorithm using the difference between the measured total dynamic power consumed by at least a portion of the integrated circuit device and the estimate of the power consumed.

10. The method as recited in claim 9, wherein the adaptive coefficient algorithm comprises an algorithm selected from the group consisting of least mean squared, normalized least mean squared, and recursive least squares.

11. The method as recited in claim 8, wherein selectively using the new weight factor values includes using the estimate of the power consumed using the new weight factor values in response to the estimate of the power consumed using the normal weight factor values having an error that is larger than an error generated by the estimate of the power consumed using the new weight factor values.

12. The method as recited in claim 8, wherein generating the weighted sum includes using a linear combiner to generate a sum of products, wherein each product is a result of multiplying an accumulated activity value for a given signal of the plurality of predetermined signals and a corresponding normal weighted value.

13. A system comprising:
a power management unit coupled to one or more processor cores, wherein the power management unit includes:
a normal mode power estimation unit configured to generate a first estimation of the power consumed by at least a portion of each processor core during operation based upon activity values and normal weight factor values for a predetermined set of signals within each processor core;
a background calibration unit coupled to the normal mode power estimation unit and configured to generate a second estimation of the power consumed by at least a portion of each processor core during operation and to adaptively generate new weight factor values based upon a total measured dynamic power consumed by each processor core during operation; and
a selection unit configured to select the new weight factor values for use by the normal mode power estimation unit based upon a difference between an accuracy of the first estimation and an accuracy of the second estimation.

14. The system as recited in claim 13, wherein the background calibration unit is configured to generate the new weight values concurrently with generation of the first estimation.

15. The system as recited in claim 13, wherein the power management unit is configured to independently control a performance of each of the processor cores based upon the estimation of the power consumed by at least a portion of each processor core.

16. A non-transitory computer readable medium storing a data structure which is operated upon by a program executable on a computer system, the program operating on the data structure to perform a portion of a process to fabricate an integrated circuit including circuitry described by the data structure, the circuitry described in the data structure including:
a power management unit configured to estimate the power consumed by at least a portion of each of one or more processor cores during operation of each processor core;
wherein the power management unit is configured to generate a sum of activity values and normal weight factor values for a predetermined set of signals within each processor core to estimate the power consumed; and
wherein the power management unit is configured to adaptively generate and selectively use new weight factor values to estimate the power consumed based upon a difference between the estimate of the power consumed and a total measured dynamic power consumed by each processor core during operation.

17. The non-transitory computer readable storage medium as recited in claim 16, wherein the power management unit is configured to independently control a performance of each of the processor cores based upon the estimation of the power consumed by at least a portion of each processor core.

18. The non-transitory computer readable storage medium as recited in claim 16, wherein the power management unit includes a calibration unit configured to adaptively generate the new weight values concurrently with generation of the estimate of the power consumed using the normal weight factor values.

19. The non-transitory computer readable storage medium as recited in claim 16, wherein the power management unit is configured to use the revised weight factor values in response to a difference between an error value generated from the normal weight factor values and an error value generated from the revised weight factor values.

20. The non-transitory computer readable storage medium as recited in claim 16, wherein the power management unit includes a calibration unit configured to adaptively generate the revised weight values concurrently with generation of the estimate of the power consumed using the normal weight factor values.

* * * * *